United States Patent Office 3,528,768
Patented Sept. 15, 1970

3,528,768
CATION EXCHANGING CRYSTALLINE ALUMINOSILICATES
Stanley Tucker, deceased, late of Willingboro, N.J., by Elliot J. Cherry, executor, Philadelphia, Pa., assignor to Mobil Oil Corporation, a corporation of New York
No Drawing. Filed Apr. 26, 1968, Ser. No. 724,686
Int. Cl. C01b 33/28
U.S. Cl. 23—111        19 Claims

ABSTRACT OF THE DISCLOSURE

The present invention is concerned with a novel method for preparaing cation-exchanged crystalline aluminosilicates, suitable for use as hydrocarbon conversion catalysts, which comprises contacting a crystalline aluminosilicate starting material with an anhydrous organic solvent solution of the desired cation, said solvent being selected from the group consisting of dimethylsulfoxide and alkyl cyanides (nitriles) and recovering the resulting product by washing and drying.

BACKGROUND OF THE INVENTION

Field of the invention

This invention relates to a novel method for preparing cation-exchanged crystalline aluminosilicates and to hydrocarbon conversion in the presence thereof.

Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminsosilicates. These aluminosilicates have come to be designated by letter or (other convenient symbol, as illustrated by zeolite A (U.S. 2,882,243), zeolite X (U.S. 2,882,244), zeolite Y (U.S. 3,130,007), zeolite K–G (U.S. 3,055,654), zeolite ZK–5 (U.S. 3,247,195), and zeolite ZK–4 (U.S. 3,314,752), merely to name a few.

The catalytic properties of metal-loaded aluminosilicates, as is well known, have been demonstrated to be extremely important to petroleum, chemical and enzymic reactions. The aluminosilicates have been activated, i.e., metal loaded for these reactions by methods employing impregnation, vapor deposition, and base-exchange, of the desired metal to be loaded. However, the metal activation potential has, therefore, been severely limited by the inability, by those skilled in the art, to exchange into the crystalline aluminosilicate structure catalytically important metals (or positive cations); notably most of the transition metals, the noble metals, and other cations such as tellurium, selenium, zirconium, vanadium, and hydrogen, just to name a few.

Cationic exchange of the "difficult" cations is thwarted or prevented, since in the aqueous media conventionally employed, one or more of the following phenomena occur:

(1) The cation is converted to an anion in aqueous solution, (a) $Mo^{+5}$ in aqueous, $MoO_4^{--}$
(b) $W^{+6}$ in aqueous, $WO_4^{--}$ (2) Compounds containing the cation are insoluble in aqueous solutions, thus no cations are formed in solutions.

(a) $PtCl_2$ (3) Compounds containing the cation on solution in aqueous media result in low pH conditions (acid) that destroy some aluminosilicates entirely, and other aluminosilicates partially.

(a) $AlCl_3$
(b) $FeCl_3$ (4) Compounds containing the cation in a complex form, which are soluble in aqueous media and able to penetrate the large pores of the faujasites, are too big to penetrate the pores of erionites so that shape-selective catalysts with these cations are impossible:

(a) $Pt(NH_3)_4Cl_2$ (5) Reaction time is often dependent on the boiling point of the aqueous solution.

SUMMARY OF THE INVENTION

It is, therefore, among one of the principal objectives of this invention to provide a method for cation exchanging the so-called difficult cations into the crystalline aluminosilicate structure. In accordance with the present invention, there has been discovered a new and improved method for preparing cation-exchanged crystalline aluminosilicates suitable for use as catalysts in hydrocarbon conversion processes, generally, and processes including hydrogenation, dehydrogenation, reforming, cracking, including hydrocracking, alkylation, isomerization, polymerization, dealkylation, and disproportionation, specificially. The method comprises contacting a crystalline aluminosilicate starting material with an anhydrous organic solvent solution of the cation desired to be introduced into said crystalline aluminosilicate, and subsequently, recovering the resultant cation-exchanged product. The anhydrous organic solvent, with which the cation presumably forms a complex in solution, is selected from the group consisting of dimethylsulfoxide, equivalents thereof, and nitriles.

DESCRIPTION OF SPECIFIC EMBODIMENTS

The crystalline aluminosilicates employed in the preparation of the subject catalyst composition are of ordered internal structure and having a pore size between about 4 and 15 angstrom units. They may be either natural or synthetic. Illustrative of particularly preferred zeolites are faujasite, erionite, mordenite, chabazite, philipsite, gmelinite, zeolite X, zeolite Y, zeolite T, and zeolite ZK-5, merely to list a few.

According to the invention, the method comprises contacting a crystalline aluminosilicate starting material with an anhydrous organic solvent solution of a metal in cationic form (i.e., presumably forming a metal complex with said solvent) and subsequently recovering the resultant cation-exchanged crystalline aluminosilicate. Those cations which are particularly preferred within the scope of the invention are those of the transition metals, (iron, cobalt, nickel) the noble metals and other metals, such as tellurium, selenium, zirconium, and vanadium, these metals having a common property in that they are difficult to exchange into the crystalline aluminosilicate structure by known aqueous medium exchange means. While it is this group of cations that is particularly within the purview of the invention, it is to be understood that the present method is applicable to all cations be they metals, ammonium, hydrogen, or the like. The anhydrous organic solvent employed is selected from the group consisting of dimethylsulfoxide and nitriles. Whide dimethylsulfoxide is preferred, its equivalents such as sulfolane (tetrahydrothiophene-1-dioxide), methylsulfolane, and dimethylsulfolane are also suitable. Illustrative of preferred nitriles are acetonitrile, acrylonitrile, and proprionitrile. The range of concentration of cation to solvent is not particularly critical, since the lower the concentration of cation, the more contacts are required, and conversely the higher the concentration is between about 0.1 weight percent to saturation. Preferably, the starting aluminosilicate material is suspended in the organic solvent before admixture with the cation-solvent solution. Reaction temperatures are not particularly critical and may range from about room temperature or below for some initial solvation to the reflux temperature of the solvent being employed in the base exchanged procedure, e.g., about 189° C. for dimethylsulfoxide. A nitrogen or inert atmosphere may be desirably maintained during the aforesaid base exchange procedures.

The invention will be further described with reference to the following specific examples which are merely illustrative in nature and are not intended to limit the invention thereto.

The following representative examples and Table I (also serving as examples of the invention) demonstrate the exchange of zeolite Y-type aluminosilicates with various metal cations.

Example 1

24.9 grams of sodium-Y zeolite were mixed with 25 cc. dimethylsulfoxide, hereinafter referred to as DMSO, and stirred at about room temperature. To the resulting mixture was added by dropping from a separatory funnel 65 cc. cobalt chloride-saturated ($CoCl_2$) DMSO. The resulting mixture was then stirred for 3 days at room temperature and then for 4 hours at a temperature between 130 and 150° F. Thereafter the cobalt chloride-DMSO solution was filtered off and one-half the filter cake was subjected to 3 washings of 50 cc. each of DMSO and one 50 cc. washing with distilled water. The sample was then dried at 110° C. for 3 days and calcined in air at about 650° F. for 4 hours. The treatment of the remaining portion of the sample will be subsequently described hereinbelow.

Example 2

50 g. of sodium Y were mixed with 200 cc. of DMSO. To the resulting mixture was added 50 cc. of palladium nitrate ($Pd(No_3)_2$) DMSO, made by dissolving one g. of palladium nitrate in 50 cc. of DMSO. The resulting mixture was stirred overnight at a temperature of about 100° C. and the resulting solution was filtered and the filter cake was washed 4 times with 100 cc. of DMSO. A portion of the washed filter cake was washed once with 50 cc. of distilled water and the cake was thereafter dried at 130° C. for a period of 3 days and then calcined in air at a temperature of 650° F. for 3 hours.

Example 3

6 g. of tellurium bromide ($TeBr_4$) were dissolved in 100 cc. of DMSO. 12 g. of sodium Y were mixed in 75 cc. of DMSO. Thereafter, the tellurium bromide-DMSO solution was added to the sodium Y-DMSO mixture accompanied by stirring for one-half hour at 150° C. Thereafter, the heat was reduced and stirring was completed at room temperature for 18 hours followed by subsequent reheating up to 100° C. for one hour. The resultant solution was filtered and the resultant filter cake was washed with two 50 cc. DMSO washes and one 50 cc. water wash. The sample was then dried at 110° C. for 16 hours, thence at 300° F. for 24 hours and finally calcined in air at 650° F. for 3 hours.

Example 4

A filtered solution of 100 cc. of saturated cobalt chloride ($CoCl_2$) DMSO solution was prepared. To this was added, with stirring, 12 g. of sodium Y mixed with 75 cc. of DMSO. Stirring was continued at 150° C. for about 3 days. The resulting solution was filtered and the resulting filter cake was washed 3 times with 50 cc. of DMSO for each washing and once with 50 cc. of distilled water. The resulting sample was dried at 110° C. for a period of about 3 days and thereafter the sample was calcined in air at 650° F. for 3 hours.

Example 5

2 g. of tungsten hexachloride ($W Cl_6$) were mixed in 100 cc. of acetonitrile, hereinafter referred to as ACTN, to which solution was added 12 g. of sodium Y mixed in 100 cc. of ACTN accompanied by stirring at room temperature for a period of about 7 days. The resulting mixture was filtered and the filter cake therefrom was washed 3 times with 50 cc. of ACTN for each washing and once with 50 cc. of distilled water and thence oven dried for a period of about 14 days. Thereafter the resulting sample was calcined in air at 650° F. for 4 hours.

Example 6

2.3 g. of chromium chloride ($CrCl_3$) and 4.5 g. of sand were combined plus a trace of zinc dust, said chromium chloride and sand being weighed in a nitrogen atmosphere and the zinc dust being purged with nitrogen. 12 g. of sodium Y were mixed in 250 cc. of DMSO and thereafter this solution was refluxed in a soxhlet extractor containing the chromium chloride, sand and trace of zinc dust at a temperature of 65° C. at a 5 mm. mercury absolute pressure difference for a period of about 24 hours. The resulting mixture was filtered and the filter cake therefrom was washed with 100 cc. of DMSO overnight. The washed cake was washed a second time with 50 cc. of DMSO and followed by one washing of 50 cc. of distilled water. Then the catalyst was dried at 110° C. for a period of about 7 days. At the end of this time, the catalyst was calcined in air at 650° F. for 3 hours and then recalcined at the same temperature for 4 hours.

Example 7

To 200 cc. of DMSO was added with stirring 25 g. of sodium Y. To this mixture was then added 100 cc. of 12 g. of tellurium tetrabromide admixed therein. Stirring was carried out at about 100° C. for a period of about 3 days. The temperature of the mixture was then raised up to 125° C. and refluxed into a Dean Stark Trap. After 4 hours at this temperature, the liquid was drained from the trap. The temperature was allowed to drop down to room temperature overnight; then the solution was filtered and the resulting filter cake was washed with 200 cc. of DMSO overnight and a third time with 150 cc. of DMSO. Thereafter, the resulting cake was washed with 200 cc. of distilled water for a period of about 3 days. The water was then filtered off and the resulting catalyst dried for about 8 days. Then the sample was calcined in air at 650° F. for 5 hours.

Example 8

11 grams of sodium Y were mixed with 100 cc. of DMSO. A filtered solution consisting of 10 grams of iron chloride ($FeCl_3$) in 100 cc. DMSO was prepared and this solution was admixed with the starting material and stirring was continued overnight. The resulting mixture was filtered, and the filter cake therefrom was re-slurried twice with 100 cc. of DMSO. Thereafter, the filter cake was heated on a hot plate to dry off the DMSO and thence it was put into an oven at 125° C. to dry.

Example 9

2.9 grams of molybdenum chloride ($MoCl_5$) were dissolved in 100 cc. of DMSO in an ice bed. 25 grams of sodium Y were mixed with 50 cc. of DMSO. 50 cc. of ammonium iodide in DMSO solution were mixed with 50 cc. of the $MoCl_5$ in DMSO solution. This solution was added slowly to the sodium Y in DMSO mixture by dropping it slowly from a separatory funnel while stirring the sodium Y in DMSO solution. Stirring continued for 18 hours at room temperature. The resulting mixture was filtered and the filter cake was washed four times with 50 cc. of DMSO for each wash followed by one 50 cc. distilled water wash. The sample was then dried at 110° C. for about 3 days and then calcined in air at 650° F. for 4 hours.

Example 10

10 grams of $H_2PtCl_6 \cdot 6H_2O$ were evaporated on a hot plate to an olive green powder to yield $PtCl_2$, which $PtCl_2$ was then dissolved in 75 cc. of DMSO. 25 grams of sodium Y were mixed with 100 cc. of DMSO, to which was then added the $PtCl_2$-DMSO solution by dropping the latter slowly through a cold condenser. Stirring thereafter followed at about 100° C. for an overnight period. The mixture was then filtered, and the resulting filter cake was washed once with 50 cc. of DMSO plus once with 50 cc. of distilled water. The sample was dried at 130° C. for a period of 11 days followed by calcining in air at 650° F. for 8 to 10 hours.

Example 11

12 g. of a zeolite known as 13X, available commercially, were mixed in a 100 cc. of DMSO. 20 g. of $H_2PtCl_6 \cdot 6H_2O$ were evaporated on a hot plate to 1 g. of platinum chloride ($PtCl_2$). The platinum chloride was then dissolved in 100 cc. of DMSO. This latter solution was then added to the 13X DMSO solution accompanied by stirring at a temperature of 150° C. for about 2½ days. The mixture was filtered and the resulting cake was washed 4 times with 50 cc. of DMSO, the fourth washing being for an overnight period. Then the cake was washed 9 times more with 50 cc. DMSO portions and a tenth washing was accomplished overnight with 50 cc. of DMSO. Thereafter, the washed cake was dried at 130° C. for about 5 days. Thereafter, the dried catalyst may be calcined at 650° F. for 3 hours.

Example 12

8 grams of $MoCl_5$ were dissolved by stirring in 100 cc. of DMSO in an ice bed. Thereafter, 12 g. of 13X were mixed with 85 cc. of DMSO, to which was added the $MoCl_5$ in DMSO solution. The mixture was stirred at 150° C. for two days. The resulting mixture was filtered, and the filter cake obtained was washed once with 50 cc. of DMSO and once with 50 cc. of distilled water. The sample was dried at 130° C. for about two days.

Example 13

85 cc. of zirconium chloride ($ZrCl_4$) DMSO saturated solution were added to a mixture of 12 grams 13X in 100 cc. DMSO. The resulting mixture was stirred at 150° C. for about three days. The solution was filtered off, and the remaining cake was washed once with 50 cc. DMSO and once with 50 cc. of water. The sample was then dried at 130° C. for about two days.

Example 14

100 cc. of a rare earth chloride ($ReCl_3$) DMSO saturated solution (filtered) were added to a mixture of 12 grams of 13X in 75 cc. of DMSO. The resulting mixture was stirred at room temperature overnight. Thereafter, the mixture was stirred at 150° C. for about one day. The solution was filtered off, and the remaining cake was

TABLE I.—ANALYSES OF EXCHANGED Y-TYPE ALUMINOSILICATES (SINGLE BATCH EXCHANGE)

| Example | NaY | 1 | 2 | 3 | 4 | 5 | 6 | 7 | 8 | 9[1] | 10 |
|---|---|---|---|---|---|---|---|---|---|---|---|
| Analyses, percent weight: | | | | | | | | | | | |
| Sodium, Na | 9.5 | 8.2 | 4.6 | 3.9 | 6.6 | 3.9 | 8.4 | 3.1 | 9.7 | 6.8 | 9.1 |
| Alumina, $Al_2O_3$ | 21.1 | 20.0 | 20.9 | 21.9 | 20.6 | 17.6 | 20.5 | | 20.8 | 20.9 | 20.6 |
| Cobalt oxide | | 1.47 | | | 3.40 | | | | | | |
| Palladium, Pd | | | 0.73 | | | | | | | | |
| Tungsten, W | | | | | | 13.8 | | | | | |
| Chromium, Cr | | | | | | | 1.60 | | | | |
| Iron, Fe | | | | | | | | | | 0.13 | |
| Tellurium, Te | | | | 3.3 | | | | 3.1 | | | |
| Nitrogen, N | | | | | | | | | | 1.37 | |
| Molybdena, $MoO_3$ | | | | | | | | | | | 0.14 |
| Solvent | | DMSO | DMSO | DMSO | DMSO | ACTN | DMSO | DMSO | DMSO | DMSO | DMSO |

DMSO—Dimethylsulfoxide. ACTN—Acetonitrile.
[1] Aluminum and molybdenum exchanged.

The following representative examples and the analytical results tabulated in Table II illustrate the base exchange of an X-type aluminosilicate with various metal cations.

washed once with 50 cc. of DMSO and once with 50 cc. of distilled water. The sample was then dried in an oven at 130° C. for about six days, followed by calcining at 650° F. for 2½ hours.

TABLE II.—ANALYSES OF EXCHANGED X-TYPE ALUMINOSILICATES (SINGLE BATCH EXCHANGE)

| Example | Zeolite 13X | 11 | 12 | 13 | 14 |
|---|---|---|---|---|---|
| Analyses, percent wt.: | | | | | |
| Sodium, Na | 8.2 | 7.0 | 10.8 | 10.1 | |
| Alumina, $Al_2O_3$ | 27.5 | 34.4 | 31.4 | 33.4 | |
| Silica, $SiO_2$ | | | | 48.8 | |
| Cobalt Oxide, CoO | | | | | |
| Platinum, Pt | | 3.8 | | | |
| Molybdena, $MoO_3$ | | | 0.36 | | |
| Zirconium, Zr | | | | 3.0 | |
| Rare Earth Oxides, $Re_2O_3$ | | | | | 4.0 |
| Tellurium, Te | | | | | |
| Solvent | | DMSO | DMSO | DMSO | DMSO |

The following representative examples and the analytical results tabulated in Table III illustrate the base exchange of a synthetic offretite-erionite type aluminosilicate (zeolite T) with various metal cations.

Example 15

50 grams of zeolite T were mixed in 175 cc. of DMSO. To this was added 50 cc. of a palladium nitrate-DMSO solution (1 g. of palladium nitrate in 50 cc. DMSO) with stirring for a period of 16 hours at room temperature. Stirring was thereafter continued at 100° C. for a period of about 3 days. After this time, the mixture was filtered and the cake was washed 4 times with 100 cc. portions of DMSO. A portion of the resulting cake was washed once with 50 cc. of distilled water and then dried at 130° C. for about 3 days. Thereafter, the sample was calcined in air at 650° F. for 3 hours.

Example 16

4 grams of tellurium tetrabromide (TeBr$_4$) were dissolved in 100 cc. of DMSO. To this, while stirring, were added 25.06 g. of zeolite T, followed by an additional 50 cc. of DMSO. The whole was stirred at 100° C. for about three days. The solution was thereafter filtered off, and the resulting cake was washed with 100 cc. of DMSO for about two days. The cake was washed a second time with 100 cc. of DMSO for about four hours and a third with 100 cc. of DMSO for about three days. Thereafter, the cake was washed once with 100 cc. of distilled water for four hours. The sample was then oven dried at 110° C. for about one day followed by calcining at 650° F. in air for five hours.

Example 17

1.2 grams of PtCl$_2$ were dissolved at room temperature in 200 cc. of DMSO. To this solution, while stirring, was added 50 grams Mount Moses offretite. The resulting mixture was stirred at 125° C. with a suitable trap for about two days. Then the reaction temperature was raised to 165° C. for 5½ hours, after which the temperature was returned to 125° C. for 18 hours. The reaction temperature was again raised to 165° C. for about three days. The solution from the resulting mixture was filtered off, and the resulting cake was washed once with 100 cc. of DMSO for 24 hours. A second wash with 100 cc. of DMSO followed for 24 hours. A third wash of 100 cc. of DMSO then followed for 6 hours, with a fourth 100 cc. DMSO wash overnight. Eight 100 cc. each distilled water washes thereafter were made on the sample for periods of three hours, 17 hours, 4 hours, 2 days, 6 days, 2 days, 12 hours, and 12 hours, respectively. Thereafter, the sample was oven dried at 110° C. for about three days, followed by calcining in air at 650° F. for five hours.

Another portion of the washed cake above (Example 15) was rewashed three times with a 100 cc. of DMSO, the first wash overnight at room temperature and finally one wash with 100 cc. of distilled water. Thereafter, the sample was dried in an oven at 100° C. for about 4 days and calcined at 650° F. in air for 3 hours. This latter prepared sample employed hereinbelow as Example 15A in a hydrocarbon conversion process illustrates the shape selective activity of the metal-loaded aluminosilicate catalyst of the invention.

Analysis of the original aluminosilicate and exchanged catalyst were:

|  | Synthetic Erionite-Offretite (Zeolite T), percent weight | Catalyst 15A, percent weight |
| --- | --- | --- |
| Sodium, Na | 2.3 | 1.6 |
| Potassium, K | 9.4 | 9.7 |
| Alumina, Al$_2$O$_3$ | 18.5 | 18.4 |
| Silica, SiO$_1$ | 65.3 | |
| Palladium, Pd | | 0.88 |

The activity of this catalyst as a shape-selective catalyst was examined by several hydrogenation experiments with a mixture of normal and isomer pentenes in a glass microreactor.

Part A.—A catalyst charge of 4 cc. (1.928 grams) of the catalyst for Example 15A (intermixed with 25 cc. of Vycor chips) was pretreated with hydrogen at 200 cc./min. by slowly raising the temperature of the reactor to 900° F. The reactor was allowed to cool to 400° F. A 50/50 volume mixture of 2-pentene and 2-methyl-2-butene was charged at an equivalents LHSV=1.0, 400° F., and 200 cc./min. of hydrogen.

A chromatographic analysis of the liquid product after 40 minutes on stream showed the following distribution.

| | Weight percent |
| --- | --- |
| Isopentane | 9.4 |
| n-Pentane | 44.7 |
| 2-methyl-1-butene | 6.5 |
| 2-pentene | 10.6 |
| 2-methyl-2-butene | 28.8 |

Most of the hydrogenation activity is apparent in the conversion of the 2-pentene to n-pentane. However, it is also apparent that some of the 2-methyl-2-butene is being hydrogenated to isopentane.

In order to remove the peripheral hydrogenation activity, the entire reactor was soaked for 15 hours in a solution of tricresylphosphate (5% TCP in methylcyclohexane). The geometry of the catalyst is such that this solution does not enter the pores. The reactor was drained of liquid and then reinstalled in the micro-unit. Helium gas was passed through the reactor while heating the reactor up to 400° F. Next, hydrogen gas was passed through the reactor for two hours at 400° F.

TABLE III.—ANALYSES OF EXCHANGED OFFRETITE-ERIONITE-ORE ALUMINOSILICATES (SINGLE BATCH EXCHANGE)

| Example | Zeolite T | 15 | 16 | Natural Erionite | 17 |
| --- | --- | --- | --- | --- | --- |
| Analyses, percent wt.: | | | | | |
| Sodium, Na | 2.3 | 1.6 | 0.57 | 3.69 | 2.30 |
| Potassium, K | 9.4 | 9.7 | 8.8 | 2.75 | 3.55 |
| Alumina, Al$_2$O$_3$ | 18.5 | 18.4 | 17.3 | 15.5 | 15.5 |
| Silica, SiO$_2$ | 65.3 | | | | |
| Palladium, Pd | | 0.88 | | | |
| Tellurium, Te | | | 0.6 | | |
| Iron, Fe | | | | 1.50 | 1.45 |
| Calcium, Ca | | | | 3.06 | 2.04 |
| Sulfur, S | | | | | 1.79 |
| Platinum, Pt | | | | | 1.6 |
| Solvent | | DMSO | DMSO | DMSO | DMSO |

Part B.—The previous experiment (Part A) was repeated exactly. Two samples of liquid product were analyzed chromatographically:

|  | Time, minutes | |
| --- | --- | --- |
|  | 0-20 | 50-120 |
|  | Wt. percent | Wt. percent |
| Isopentane | 0.4 | 0.6 |
| n-Pentane | 10.7 | 11.6 |
| 3-methyl-1-butene | 0.4 | 0.3 |
| 1-pentene | 1.4 | 2.1 |
| 2-methyl-1-butene | 4.6 | 4.8 |
| 2-pentene | 42.3 | 37.4 |
| 2-methyl-2-butene | 40.2 | 43.3 |

These data conclusively indicate that a catalyst prepared and treated as described is "shape selective" for the hydrogenation of iso- and n-olefins. The n-pentene is hydrogenated to n-pentane, while very little iso-pentene is hydrogenated. Isomerization of the iso-pentene occurs, but the total iso-olefins very nearly equals that of the charged isopentene. Thus, it may be concluded that the active palladium hydrogen sites are well within the pores of the catalyst.

The hydrogenation activity test was merely to confirm the location of the active noble metal site, and is not intended to restrict the potential activity of this catalyst to hydrogenation alone.

The following experiments, summarized in Tables IV and V hereinbelow, demonstrated the conversion of toluene to benzene using the cation exchange catalyst prepared by the present invention. As is well known, the reaction converting toluene to benzene is extremely important to those skilled in the art.

The catalyst employed below, identified as Example 1A, was prepared by treating the remaining volume of the catalyst solution of Example 1 with 50 cc. of $$NH_4I—(CH_3)_2SO$$

solution, accompanied by stirring for three days at room temperature. The resulting mixture was filtered, and the filter cake was washed three times with 50 cc. portions of DMSO and finally one washing of 50 cc. distilled water. The sample was dried overnight at 110° C. and then calcined in air at 650° F. for four hours. Finally, it was calcined a second time under the same conditions.

TABLE IV.—DEALKYLATION OF TOLUENE TO BENZENE OVER COBALT-EXCHANGED-Y-ALUMINOSILICATE

| Catalyst from Example | 1A | 4 |
| --- | --- | --- |
| Micro-reactor conditions: | | |
| Temperature, °F | 1,050 | 1,050 |
| Pressure, p.s.i.g | ATM | ATM |
| Space velocity, LHSV | 1.0 | 1.0 |
| Hydrogen charge, s.c.f./B | 17,800 | 19,000 |
| Hydrogen consumption, (approximately) s.c.f./B | (415) | (225) |
| Results, coke-free basis: | | |
| Yields, wt. percent: | | |
| Methane | 2.3 | 1.1 |
| $C_2$ | 1.2 | 0.4 |
| $C_3$ | 0.0 | 0.0 |
| Total dry gas | 3.5 | 1.6 |
| $C_4$ | 0.0 | 0.0 |
| $C_5$ | 0.1 | 2.3 |
| Benzene | 26.1 | 13.8 |
| Toluene | 57.4 | 73.5 |
| Xylenes, ethylbenzene | 13.5 | 9.2 |
| Conversion | 42.6 | 26.5 |
| Benzene Selectivity, percent (100×mols benzene/mol toluene) | 72 | 62 |
| Benzene source, percent: | | |
| Dealkylation | 62 | 51 |
| Disproportionation | 38 | 49 |
| Catalyst analysis, percent wt.: | | |
| Cobalt oxide, CoO | 1.16 | 3.4 |
| Alumina, $Al_2O_3$ | 21.1 | 20.6 |
| Sodium, Na | 5.5 | 6.6 |

TABLE V

Dealkylation of toluene to benzene over tellurium-exchanged-Y-aluminosilicate

| | |
| --- | --- |
| Catalyst from example | 3 |
| Micro-reactor conditions: | |
| Temperature, °F | 1050 |
| Pressure, p.s.i.g. | Atm. |
| Space velocity, LHSV | 1.0 |
| Hydrogen charge, s.c.f./b. | 17,500 |
| Hydrogen consumption (approximately), s.c.f./b. | 168 |
| Results, coke-free basis, yields, wt. percent: | |
| Methane | 1.5 |
| $C_2$ | 0.2 |
| $C_3$ | 0.0 |
| Total dry gas | 1.7 |
| $C_4$ | 0.0 |
| $C_5$ | 0.6 |
| Benzene | 24.4 |
| Toluene | 59.5 |
| Xylenes, ethylbenzene | 14.2 |
| Conversion | 40.5 |
| Total benzene selectivity, percent (100×mols benzene/mol toluene) | 71.0 |
| Benzene source, percent: | |
| Dealkylation | 57 |
| Disproportionation | 43 |
| Catalyst analysis, percent wt.: | |
| Tellurium, Te | 3.9 |
| Alumina, $Al_2O_3$ | 21.9 |
| Sodium, Na | 3.9 |

It is to be noted from the data of Tables IV and V that the invention catalysts showed good conversion values of toluene to benzene and high selectivity to benzene.

What is claimed is:

1. A method for preparing cation exchanged crystalline aluminosilicates which comprises contacting a crystalline aluminosilicate of ordered internal structure with an anhydrous organic solvent solution of a cation, said anhydrous organic solvent solution being selected from the group consisting of dimethylsulfoxide, sulfolane, methylsulfolane, dimethylsulfolane, acetonitrile, acrylonitrile, and propionitrile, and recovering the resultant cation exchanged crystalline aluminosilicate.

2. The method of claim 1 wherein said cation is selected from the transition metals.

3. The method of claim 1 wherein said cation is selected from the noble metals.

4. The method of claim 1 wherein said cation is selected from tellurium, selenium, zirconium, and vanadium.

5. The method of claim 1 wherein said solvent solution is dimethylsulfoxide.

6. The method of claim 1 wherein said solvent solution is acetonitrile.

7. The method of claim 1 wherein said solvent solution is acrylonitrile.

8. The method of claim 1 wherein said solvent solution is proprionitrile.

9. The method of claim 1 wherein said solvent solution is dimethylsulfoxide and said cation is tellurium.

10. The method of claim 1 wherein said crystalline aluminosilicate of ordered internal structure is faujasite.

11. The method of claim 1 wherein said crystalline aluminosilicate of ordered internal structure is erionite.

12. The method of claim 1 wherein said crystalline aluminosilicate of ordered internal structure is mordenite.

13. The method of claim 1 wherein said crystalline aluminosilicate of ordered internal structure is chabazite.

14. The method of claim 1 wherein said crystalline aluminosilicate of ordered internal structure is philipsite.

15. The method of claim 1 wherein said crystalline aluminosilicate of ordered internal structure is gmelinite.

16. The method of claim 1 wherein said crystalline aluminosilicate of ordered internal structure is zeolite X.

17. The method of claim 1 wherein said crystalline aluminosilicate of ordered internal structure is zeolite Y.

18. The method of claim 1 wherein said crystalline aluminosilicate is zeolite T.

19. The method of claim 1 wherein said crystalline aluminosilicate is zeolite ZK–5.

References Cited

UNITED STATES PATENTS

| | | | |
|---|---|---|---|
| 3,264,208 | 8/1966 | Plank et al. | 252—455 |
| 3,375,065 | 3/1968 | McDaniel et al. | 23—112 |
| 3,471,412 | 10/1969 | Miale et al. | 252—455 |

EDWARD J. MEROS, Primary Examiner

U.S. Cl. X.R.

252—455